United States Patent [19]
Lowry et al.

[11] 3,752,916
[45] Aug. 14, 1973

[54] METHOD AND APPARATUS FOR IMPROVING THE HORIZONTAL SHARPNESS OF ELECTRONICALLY SCANNED IMAGES

[75] Inventors: John D. Lowry, Willowdale, Ontario, Canada; Kenneth F. Holland, Granada Hills, Calif.

[73] Assignee: Ellanin Investments, Ltd., Toronto, Ontario, Canada

[22] Filed: Sept. 30, 1971

[21] Appl. No.: 185,157

[52] U.S. Cl. ........ 178/7.3 R, 178/6.7 R, 178/6.7 A, 178/7.5 R, 178/DIG. 34

[51] Int. Cl. .......................... H04n 3/16, H04n 5/84

[58] Field of Search ...................... 178/6.8, DIG. 25, 178/DIG. 34, 7.3 R, 7.5 R, 6.7 A, 6.7 R; 315/22, 26; 346/110 R

[56] References Cited

UNITED STATES PATENTS 3,479,453 11/1969 Townsend ........................... 178/6.8

3,536,826 10/1970 McMann, Jr. ............... 178/DIG. 25

*Primary Examiner*—Robert L. Griffin
*Assistant Examiner*—George G. Stellar
*Attorney*—Harry G. Weissenberger et al.

[57] ABSTRACT

Superior sharpness at interface between low-and high-intensity image areas of an electronically scanned image is obtained by controlling the scan speed of the beam in addition to, and in accordance with changes in, its intensity. The scan speed variation signal is produced by time-delaying and mathematically processing the incoming intensity signal. In the preferred embodiment, the scan speed variation signal is superimposed upon the linear horizontal scan signal by applying it to an extra push-pull-connected pair of horizontal deflection plates.

15 Claims, 11 Drawing Figures

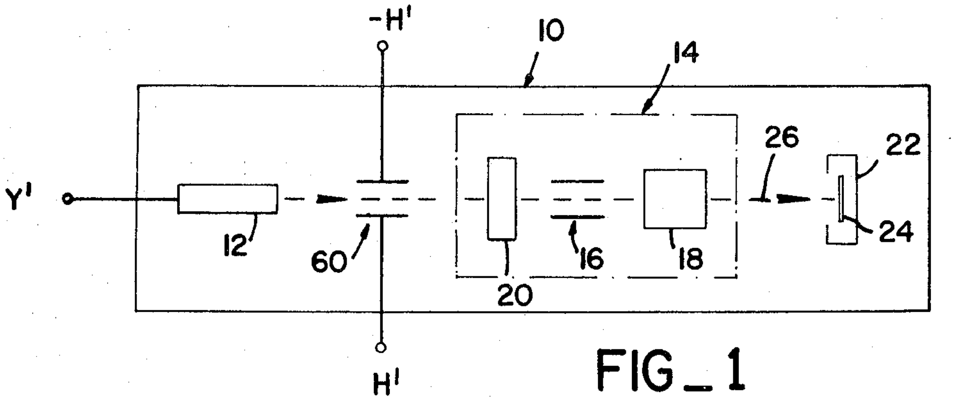
FIG_1
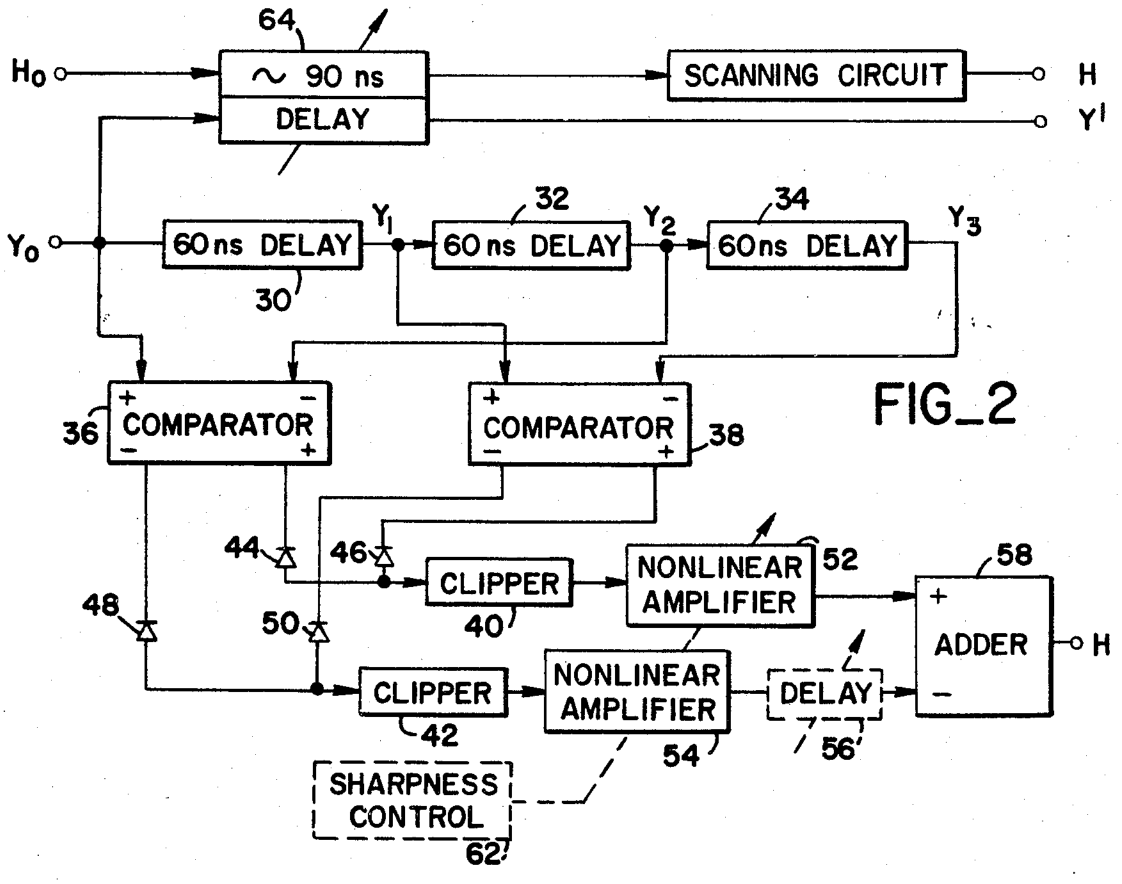
FIG_2
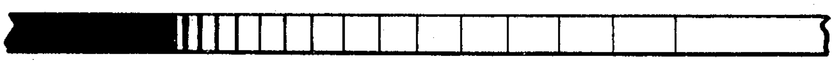
FIG_4a UNCOMPENSATED Y SIGNAL
FIG_4b PRIOR ART COMPENSATED Y SIGNAL
FIG_4c SCAN VELOCITY COMPENSATION

METHOD AND APPARATUS FOR IMPROVING THE HORIZONTAL SHARPNESS OF ELECTRONICALLY SCANNED IMAGES

BACKGROUND OF THE INVENTION

When the electron beam of a black-and-white television picture tube moves across a sharp edge between a black and white object, perfect picture quality (i.e., sharpness) requires the beam intensity signal (usually designated as Y) to switch instantly from the low level required for the black object to the high level required for the white object. In practice, however, the Y signal has a finite bandwidth dictated by the camera and recording equipment and transmission parameters, and a substantially vertical rise or drop of the Y signal is therefore impossible.

In one form of conventional television circuitry, the edge sharpness is enhanced by emphasizing the signal immediately before and immediately after the transition. For example, in a black-to-white transition, the low black level of the Y signal is further reduced for a short period of time just prior to the transition, and the high white level of the Y signal is momentarily augmented immediately after the transition. Although this procedure actually increases the transition time rather than reduce it, the emphasis areas create a visual edge effect which psychologically registers as improved sharpness.

The above-described edge effect method if often sufficient enhancement for the relatively poor picture quality normally associated with even the best commercial television systems. However, this method is inadequate for the extremely high sharpness demanded of the image conversion equipment which produces 16 mm., 35 mm. or even 70 mm. motion picture film, particularly color film, from video tape, or for any large-screen presentation of scanned images.

A further improvement in sharpness is shown in U.S. Pat. No. 2,851,522, in which delay and differentiation techniques are used together with a pulse correction circuit to steepen the rise or fall of the Y signal at an interface. The method of U.S. Pat. No. 2,851,522, however, requires complex filtering and pulse correction circuits to prevent overemphasis, and it requires a compromise setting as its overall response varies substantially with the magnitude change. Also, the complexity of the circuitry required for this method increases rapidly as increasing amounts of correction are sought, and its practical ability to shorten the transition time is limited.

A method useful in producing alphanumeric characters on a cathode ray tube screen is shown in U.S. Pat. No. 3,403,286. In that patent, a sawtooth wave is added to the horizontal sweep signal in such a manner that the beam moves to a first predetermined position, pauses, moves to a second predetermined position, pauses again and so forth. The intensity of the beam is selectively increased during the pauses to produce a dot of light in selected ones of the predetermined positions. The intermittent movement of the beam increases the light output at the selected positions and assures that the light dots are produced at exactly the right points on the screen.

The sawtooth method, however, is not usable in moving image applications because the positions of the light dots on the screen are inherently fixed. Thus, it is limited to producing geometrically expressible patterns and cannot be used to enhance a randomly illuminated moving image signal.

SUMMARY OF THE INVENTION

Basically, in accordance with the present invention, the slope of the screen illumination variation at an interface is increased not by modifying the beam intensity signal as in the prior art, but by varying the sweep velocity as a function of variations of the beam intensity signal. The composite effect of the intensity signal change and the sweep velocity change is an almost perfectly instantaneous change of the screen illumination at the interface. In the case of an electron beam recorder for the non-optical production of motion picture film, the term "screen illumination" as used herein corresponds, of course, to the degree of electronically produced exposure of the film at any given point, and therefore the term "exposure" is used herein to designate the brightness of a point in the image regardless of whether a luminous display or a film recording is involved.

The sweep velocity variation signal may be applied to the electron beam either by way of an additional pair of horizontal deflection plates, as in the preferred embodiment shown herein, or by way of an electronic superposition of the sweep velocity variation signal onto the horizontal sweep signal.

The sweep velocity variation signal (hereinafter called the H' signal) is derived from the beam intensity signal in the preferred embodiment by combining a delay-and-comparison process with a peaking and nonlinear amplification process which produces an H' signal adjustable to provide practically any desired degree of sharpness.

It is therefore the object of the invention to provide a method and means for improving the horizontal sharpness of electronically produced images by using a variable-velocity sweep steered by a signal derived from the intensity signal.

BRIEF DESCRIPTION OF THE DRAWINGS

FIG. 1 is a plan view of an electron beam recording device used in the preferred embodiment of the invention;

FIG. 2 is a block diagram of the signal processing circuit used in carrying out the inventive method;

Figures 3A, 3B, 3C, 3D, 3E, 3F:
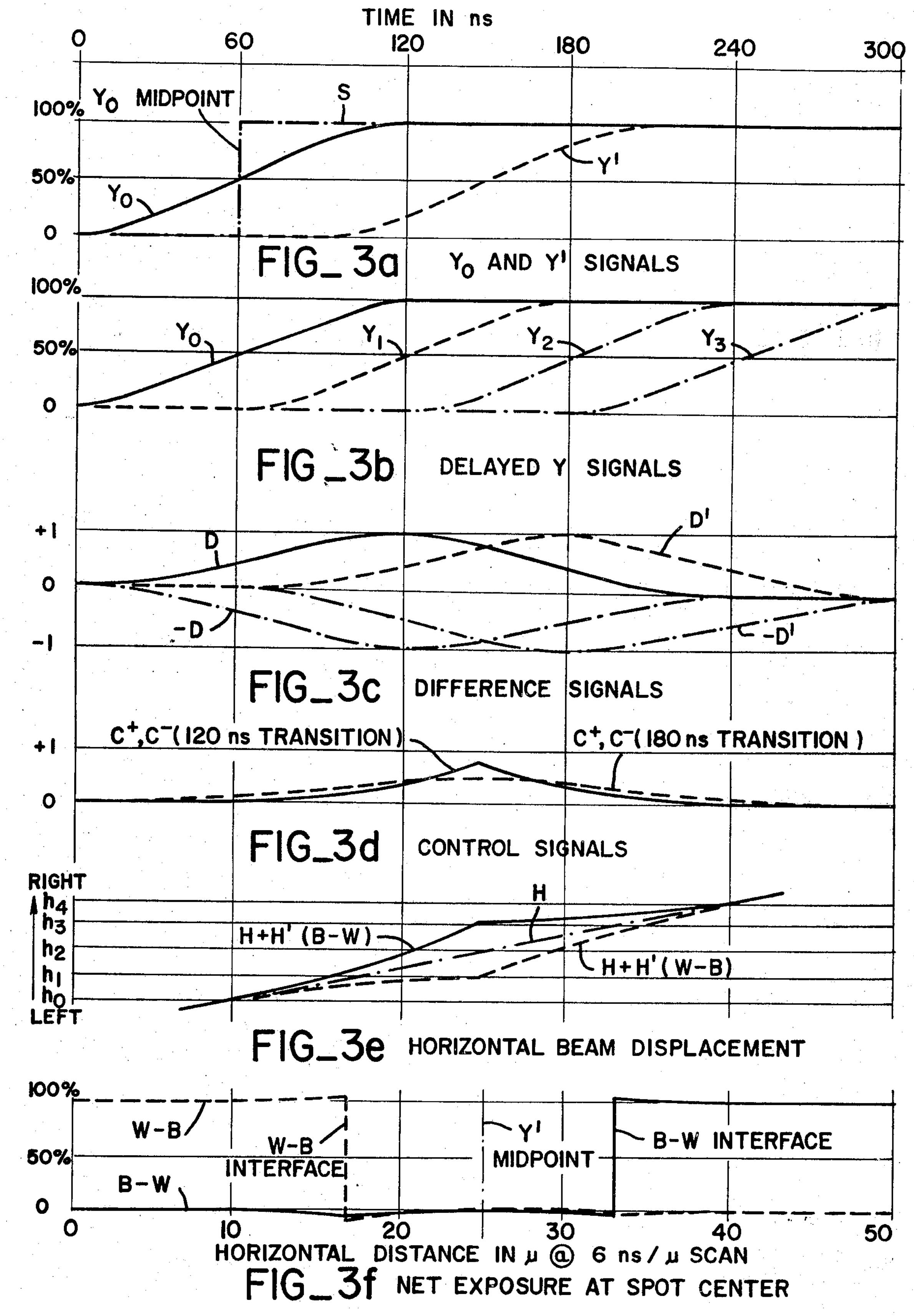

FIGS. *3a–3f* are time-amplitude diagrams illustrating the waveforms appearing at various points in the circuitry of FIG. 2; and FIGS. *4a–4c* are pictorial representations of portions of the images produced by some of the waveforms of FIG. 3 and by prior art methods.

DESCRIPTION OF THE PREFERRED EMBODIMENT

FIG. 1 shows, in somewhat schematic form, an electron beam recording device 10 consisting of an electron gun 12; a scanning mechanism 14 consisting of horizontal deflection plates 16, vertical deflection plates 18, and focusing coil 20; and a film guide 22. Successive frames of electron-sensitive motion picture film 24 are positioned in the guide 22 during the operation of the device by a conventional film transport mechanism (not shown), and are exposed by the electron beam 26 as it scans across the film 24 in the same manner as the beam of a television picture tube scans the picture tube screen.

In the production of motion picture film from a video tape recording, the signal coming from the video tape recorder can be a conventional television signal, usually a demodulated FM signal, which can be separated by conventional circuitry into an intensity signal Y and appropriate other signals such as scan synchronization signals. The bandwidth of most conventional video tape recorders is such that the minimum transition time in which the Y signal can change from one steady value to another, is about 120 ns.

The present invention is concerned with providing, in the production of motion picture film from video tape or in any other environment (such as large screen display) in which it is required, the high degree of horizontal sharpness necessary to produce on the target (exemplified in FIG. 1 by film 22) an image consistent with the sharpness movie patrons have learned to expect from optically produced motion pictures. Theoretically, the sharpness of optically produced images is limited by the grain size of the film, which in good recording film is about 0.1 $\mu$. By contrast, at a horizontal scan rate of approximately 6 ns/ $\mu$ for 16 mm. film in the electron beam recorder of FIG. 1, the 120 ns minimum transition time of the video tape Y signal translates into a maximum sharpness of 20 $\mu$, representing a picture quality tolerable in a television set but not in a movie theater. FIG. *4a* illustrates the reproduction of a sharp edge between a black area and a white area by an uncompensated video tape Y signal.

Prior art signal-enhancing methods such as that shown in U.S. Pat. No. 2,851,522 have succeeded in reducing the minimum transi-tion time to about 60 ns, resulting in the better sharpness of about 10 $\mu$ illustrated in FIG. *4b*. By contrast, the combination of the uncompensated Y signal with a variable-velocity scan as taught by the present invention easily produces a sharpness of 1 $\mu$ or better, as illustrated in FIG. *4c*, and is capable of producing resolution even beyond the 0.1 $\mu$ grain size merely by tightening the tolerance of the electronic components involved.

FIG. 3 shows the waveforms involved in the process of this invention for a sudden transition, denoted B-W, from black (0% Y) to white (100% Y). In addition, FIGS. *3c* through *3f* also include corresponding waveforms for a white-to-black (W-B) transition.

In FIG. *3a*, curve S denotes the actual light intensity of the scene seen by the television camera. At a point in the scene corresponding to 60 ns scan time from an arbitrary reference point, there is an interface (denoted $Y_o$ Midpoint) at which the scene abruptly changes from black to white. Due to the bandwidth characteristics of the equipment involved, however, the incoming intensity signal from the video tape recorder, denoted $Y_o$ in FIG. *3a*, cannot change at a rate greater than 120 ns per transition, regardless of the intensity percentage change involved, and thus cannot exceed the slope shown in FIG. *3a*.

To compensate for this inability of the $Y_o$ signal to follow the vertical rise of curve S, a scan velocity control signal is derived from the $Y_o$ signal by first delaying the $Y_o$ signal three times by 60 ns each time in delay devices 30, 32, and 34 (FIG. 2) to produce the delayed Y signals $Y_1$, $Y_2$, and $Y_3$ (FIG. *3b*). The $Y_o$ signal is also delayed by about 90 ns in a delay device 64, which may be adjustable for reasons discussed hereinafter, to form the delayed Y signal Y′ applied to the gun 12 in FIG. 1.

The $Y_2$ signal is algebraically subtracted from the $Y_o$ signal by comparator 36 to produce a difference signal D (FIG. *3c*) and an inverted difference signal −D at the positive and negative outputs, respectively, of comparator 36. Likewise, the $Y_3$ signal is subtracted from the $Y_1$ signal by comparator 38 to produce delayed difference signals D′ and −D′. It will be understood that when the transition of $Y_o$ is in the decreasing-intensity direction instead of the increasing-intensity direction shown in FIGS. *3a* and *b*, D and D′ appear at the negative outputs of comparators 36 and 38, respectively, and −D and −D′ appear at their positive outputs.

Diodes 44, 46 are connected to present to the input of clipper 40, at any given instant, the most negative (or least positive) of the signals D and D′. Likewise, diodes 48, 50 are connected to present to the input of clipper 42 the most negative (or least positive) of the signals −D and −D′. Clippers 40 and 42 are each arranged to pass only the positive portions of the signals presented to their inputs by the diodes 44, 46, 48 and 50. Thus, the output of clipper 40 is the control signal $C^+$ appearing only during increasing-intensity transitions, whereas the output of clipper 42 is an identical control signal $C^-$ appearing only during decreasing-intensity transitions.

Following amplification, and disregarding for the moment the optional delay device 56, the amplified $C^+$ signal and the amplified $C^-$ signal are algebraically added in adder 58 to produce the H′ signal of FIG. 2. In the preferred embodiment of the invention, the H′ signal is applied to the velocity control deflection plates 60 in FIG. 1, preferably in a push-pull arrangement in which the H′ signal is applied to one plate and an inverted H′ signal −H′ is applied to the other.

The H′ signal may advantageously be derived from an inverted or negative output (not shown) of adder 58, as it is important for the preservation of the proper time relationships in the system that all coincident signals (such as D and −D or $C^+$ and $C^-$) be processed through identical circuits. The horizontal displacement of beam 26 as a function of time due to the combined effect of the linear horizontal scan signal H applied to deflection plates 16, and of the scan velocity control signal H′ applied to deflection plates 60, is shown in FIG. *3e*. It will be seen that as the beam 26 approaches the interface position $h_3$ of the image, it begins to speed up at the 60 ns mark, and speeds up more and more until it reaches the interface position $h_3$ at the 150 ns mark. Inasmuch as the exposure of the film 22 is proportional to the intensity of the beam 26 and inversely proportional to its scan velocity, it will be seen that after a slight dip in the B-W exposure curve of FIG. *3f*, the rise in Y′ between the 90 ns and 150 ns marks is approximately offset by the increasing scan velocity of the beam 26.

After the beam 26 reaches the interface position $h_3$ at the 150 ns mark, it stops momentarily, then gradually picks up speed again until, at the 240 ns mark, it is once again traveling at the linear scan velocity H (FIG. *3e*) and in the position in which it would have been if no intensity transition had occurred. Thus, between the 150 ns mark and the 210 ns mark, the slow scan velocity of the beam 26 approximately compensates for the amplitude deficiency of the Y′ signal. Following a slight emphasis between the 210 and 240 ns marks, the B-W exposure curve flattens out at 100 percent amplitude at the 240 ns mark. Thus, except for a slight negative emphasis in exposure just prior to the interface and a slight positive emphasis just after it, the B-W exposure level transition at the interface is practically instantaneous.

The same process occurs in reverse in a decreasing-intensity (W-B) transition such as is illustrated by the dotted lines in FIGS. 3*e* and 3*f*. It will be noted in FIG. 3*f* that the B-W and W-B transitions are offset from the midpoint of the Y' transition and from each other. This offset is due to the nonlinearity of the beam motion at the interface, and it results in narrowing light-colored objects in the image and widening dark-colored objects. In practice, the magnitude of the offset is so small that it is usually not noticeable by the observer. However, if need be, the offset can be corrected as discussed hereinafter.

The transition time in FIG. 3 can be controlled at will by adjusting the overall gain of the nonlinear amplifiers 52, 54 by means of the sharpness control 62 of FIG. 2. With no gain, there is no compensation at all, and the transition time is the transition time of Y'. As the gain is increased, the exposure level transition time becomes shorter and shorter, until the beam 26 actually reverses its direction of travel at the interface and noticeable overexposure begins to occur. The optimum gain setting occurs when the beam just stops at the interface, i.e., when the right half of the H+H' (B-W) curve and the left half of the H+H' (B-W) curve and the left half of the H+H' (W-B) curve are tangential to the horizontal at the peaks in FIG. 3*e*.

Inasmuch as the amplitude of H', as well as its slope adjacent the peak, varies strongly with the precentage magnitude of the transition, it will be seen that the ideal amplification characteristic of the nonlinear amplifiers 52, 54 would be one which amplifies all peak amplitudes of the C signals to a single predetermined peak amplitude and slope change of the H' signal. For practical purposes, it is sufficient if the peak H' signal corresponding to the maximum peak amplitude of the C signal is twice the peak H' signal corresponding to a peak C signal amplitude of 10 percent of maximum. For C signal amplitudes below 10 percent, the amplification should fall off rapidly to prevent undue noise amplification. Amplifiers having such a characteristic and also fulfilling the contradictory requirement of slope preservation can be designed by using conventional design methods such as, for example, anticipatory gain control.

As will be apparent from FIG. 3*e*, the displacement of the image interfaces from the Y' transition midpoint is proportional to the amplitude of the H' signal. With the H' peak amplitude varying through a relatively narrow range for most transitions in which any correction at all occurs, it is possible to approximately compensate for the displacement, if desired, by introducing an adjustable delay 56 into the $C^-$ signal path (FIG. 2), and to increase the delay of adjustable delay device 64 by a like amount. Such a compensation is made, however, at the expense of some emphasis distortion adjacent the interface because the H' signal peak is then no longer coincident in time with the midpoint of the Y' signal transition.

The primary function of the adjustable delay device 64 is to delay the $Y_0$ signal by the amount necessary to produce a Y' signal whose transition midpoint is coincident in time (in the absence of delay device 54) with the peak of the H' signal. In FIG. 3*a*, the delay of Y' is shown as 90 ns. In practice, it would be slightly more to compensate for spurious delays (not shown) inherent in the electronic circuitry including the comparators, diodes, clippers, amplifiers, and adder of FIG. 2.

It will be understood that in order for the Y' midpoint to appear in the same position on the image as the interface in the original scene, the scan synchronizing signal $H_0$, as shown in FIG. 2, in order to produce the H signal, by the same amount as the $Y_0$ signal is delayed by device 64.

A study of the dotted line of FIG. 3*d* readily shows that if the transition time of the $Y_0$ signal increases by as little as 60 ns, the C signals no longer peak but flatten out, because the then flattened crests of the D and D' signals merge into one another. This effect is necessary because a $Y_0$ transition time significantly greater than 120 ns no longer indicates an edge in the original scene, but rather a "soft" intensity transition sufficiently gradual for the equipment to follow accurately. Thus, the method of this invention will not create sharp edges in the image where there are none in the original scene.

Although the sharpness of a transition can be improved to almost perfection by the method of the present invention, the resolution of the image (i.e., the ability of the system to follow a rapid sequence of transitions) is limited to about 100 ns because of the distortion occurring in the peak of the C signals when several transitions occur at closer intervals.

The emphasis just before and after the interface in FIG. 3f is desirable to compensate for the inherent "bandwidth" of the film itself, i.e., its inability to accurately record sharp intensity variations of the beam. Actually, to the human eye, a slight emphasis before and after the interface produces a more natural-looking edge in the image, and is therefore psychologically desirable also.

The delays indicated in the foregoing discussion are not absolute but may be varied somewhat as specific applications may require. For example, delays of 50 ns in devices 30, 32, 34 and about 75 ns in device 64 may be preferable under certain circumstances, and the optimum amount of delay is largely a matter for empirical determination on the particular equipment involved.

What is claimed is:

1. A method of producing substantially instantaneous exposure transitions on a target scanned by a scanning beam whose intensity is controlled by a variable intensity signal having a limited bandwidth, comprising the steps of:

a. deriving from said intensity signal a control signal related to variations in the amplitude of said intensity signal:
b. using said control signal to vary the scan velocity of said scanning beam;
c. delaying said intensity signal; and
d. causing said control signal to have an amplitude which gradually increases prior to the transition of said delayed intensity signal, peaks sharply at the center of said transition, and gradually decreases after said transition, so as to cause an abrupt change in the scan velocity of said scanning beam during said transition.

2. The method of claim 1, further comprising the step of causing the sign of said control signal to be determined by the direction in which said intensity signal amplitude changes during said amplitude transition.

3. A method of producing substantially instantaneous exposure transitions on a target scanned by a scanning beam whose intensity is controlled by a variable intensity signal having a limited bandwidth, comprising the steps of:
a. deriving from said intensity signal a control signal related to variations in the amplitude of said intensity signal;
b. using said control signal to vary the scan velocity of said scanning beam;
c. delaying said intensity signal; and
d. causing said control signal to have an amplitude which gradually increases prior to the transition of said delayed intensity signal, peaks sharply at substantially the center of said transition, and gradually decreases after said transition, so as to cause an abrupt change in the scan velocity of said scanning beam during said transition, peak being displaced from the midpoint of said transition in one direction for increasing-intensity transitions, and in the opposite direction for decreasing-intensity transitions.

4. A method of producing substantially instantaneous exposure transitions on a target scanned by a scanning beam whose intensity is controlled by a variable intensity signal having a limited bandwidth, comprising the steps of:
a. deriving from said intensity signal a control signal related to variations in the amplitude of said intensity signal;
b. using said control signal to vary the scan velocity of said scanning beam;
c. delaying said intensity signal;
d. causing said control signal to have an amplitude which gradually increases prior to the transition of said delayed intensity signal, peaks sharply at substantially the center of said transition, and gradually decreases after said transition, said sharp amplitude peaking occurring only at those transitions of said delayed intensity signal which have less than a predetermined transition time.

5. Apparatus for producing substantially instantaneous exposure transitions on a target scanned by a scanning beam whose intensity is controlled by a variable intensity signal having a limited bandwidth, comprising:
a. means for receiving said intensity signal;
b. means for deriving from said intensity signal a control signal related to variations in the amplitude of said intensity signal;
c. means responsive to said control signal for varying the scan velocity of scanning beam;
d. means for delaying said intensity signal; and
e. means for causing said control signal to have a sign determined by the direction of said amplitude variation, and an amplitude which gradually increases prior to the transition of said delayed intensity signal, peaks sharply at substantially the center of said transition, and gradually decreases after said transition, so as to cause an abrupt change in the scan velocity of said scanning beam at said transition.

6. Apparatus according to claim 5, said last-named means being arranged so that said abrupt change of slope is displaced from the midpoint of said transition in one direction for increasing-intensity transitions, and in the opposite direction for decreasing-intensity transitions.

7. Apparatus for producing substantially instantaneous exposure transitions on a target scanned by a scanning beam whose intensity is controlled by a variable intensity signal having a limited bandwidth, comprising:
a. means for receiving an original intensity signal;
b. means for producing at least one delayed intensty signal from said original intensity signal;
c. delaying and comparing means for deriving from said intensity signals a pair of mutually delayed difference signals each representing the difference between two of said intensity signals;
d. means for comparing at least a portion of each of said mutually delayed difference signals to derive therefrom a peaked control signal; and
e. means for operatively combining said control signal with the scan signal of said scanning beam to produce an abrupt change in the scan velocity of said beam at said peak of said control signal.

8. Apparatus according to claim 7, further including means for causing the amplitude of said control signal at any given time to be the lower of the amplitudes of the signals being compared by said comparing means.

9. Apparatus according to claim 7, further including means for causing the magnitude of said delays to be such that said control signal is peaked substantially only for intensity transitions having less than a predetermined transition time, and becomes substantailly rounded for slower intensity transitions.

10. Apparatus according to claim 7, in which said means for operatively combining said control signal with said scan signal include means for amplifying said control signal.

11. Apparatus according to claim 10, in which said amplifying means are nonlinear.

12. Apparatus according to claim 11, in which said amplifying means emphasize low signal amplitudes substantially more than high signal amplitudes but substantially preserve the abruptness of the change of slope of said control signal at the peak thereof.

13. Apparatus according to claim 11, further comprising control means for controlling the gain of said amplifying means.

14. Apparatus for producing sharp edge effects in a scanned picture in which a sharp edge in scanned picture is represented by an intensity transition having a predetermined minimum transition time dictated by bandwidth restrictions, comprising:
a. delaying and comparing means for deriving from the intensity signal a control signal whose amplitude gradually increases prior to the transition, peaks sharply at the center of the transition, and gradually decreases after the transition, and whose sign is determined by the direction of the transition; and
b. means for varying the sweep velocity of the picture scan in accordance with said control signal;
c. said delaying and comparing means being so arranged that the peak amplitude and peaking sharpness of said control signal rapidly diminishes as the transition time of an intensity transition in said picture increases beyond said predetermined minimum transition time associated with a sharp edge in said original scene.

15. Apparatus according to claim 14, further comprising means for amplifying said control signal before using it to vary the sweep velocity of said scan, said amplifying means having a response curve such as to amplify higher control signal levels substantially more than lower control signal levels, whereby transitions involving small intensity changes such as noise remain substantially unenhanced.

* * * * *